Patented Oct. 26, 1948

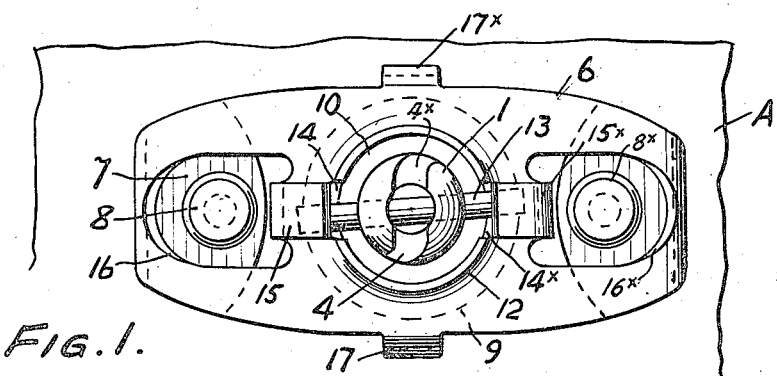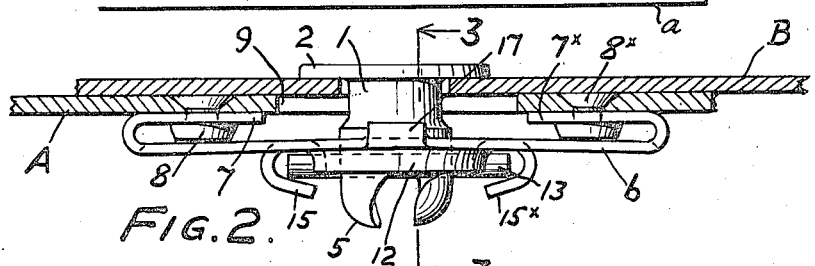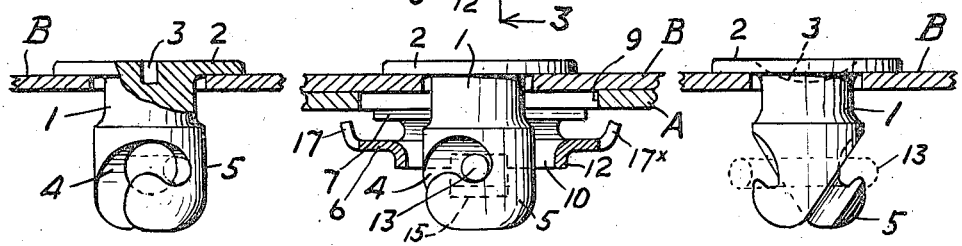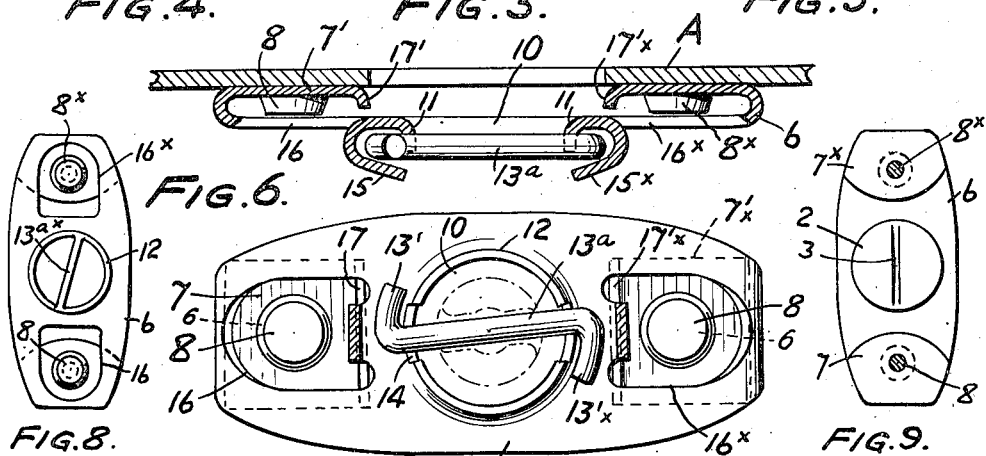

2,452,437

UNITED STATES PATENT OFFICE 2,452,437

FASTENING DEVICE

Edmond C. Crowther, Philadelphia, Pa.

Application November 3, 1943, Serial No. 508,788

4 Claims. (Cl. 24—221.2)

1

This invention relates to a fastening device and more particularly relates to a keeper element adapted for use in combination with a stud provided with spiral slots, as shown, for example, in United States Patents Nos. 1,955,740 and 1,-986,329, comprising a tubular member provided with oppositely located spiral slots, and rotatably secured to a member to be fastened, for engagement with a keeper element, secured to, or in engagement with, another member, and comprising a spring, has heretofore been well known and has been quite widely used, for example, in airplane construction for removably fastening engine cowling, cover plates for apertures giving access to mechanism located interiorly of wings, and the like.

As shown, for example, in United States Patents Nos. 1,955,740 and 1,986,329, the keeper elements heretofore used with such a stud have comprised a length of spring wire adapted to be engaged in the oppositely arranged spiral slots in the stud and to be placed under tension on turning of the stud through the drawing effect of the spiral slots, which, in effect, act as in a bayonet joint.

Studs of this type, in combination with keepers of the type heretofore known, while highly efficient under certain conditions, has been found to lack certain desirable qualities under other conditions. Thus, alignment of the stud for initial engagement with the keeper spring may be problematical; the keeper spring serves both the function of a strength member and of a tension member, neither of which functions can be performed by a single member with maximum efficiency; the keeper element provides no great counter-resistance to shear force on the stud, depending entirely on the strength of the cross section of the wire spring of which it is formed; and the spring member may tend, under heavy strain, as when a cover member in, for example, a wing surface, may be lifted away from the wing surface under the exceptionally heavy lifting force exerted on it in the driving of an airplane, to stretch beyond its elastic limit and cease to function as a spring.

Now it is the object of this invention to provide, and in accordance with this invention there is provided, a keeper element for use in combination with a stud of the type mentioned.

Thus, in accordance with this invention, a keeper element is provided which will variously, in varying embodiments of this invention, lend itself to ready alignment with the stud for initial engagement; which will provide separate strength and tension elements which respectively may be formed of material and treated for maximum efficiency; which will provide support for the stud against shearing forces; and which will insure against stretch of the spring element beyond its elastic limit irrespective of the force applied to it.

Having now indicated the nature of this invention and its relation to the prior art, I will proceed, with reference to the accompanying drawings, to a detailed description of preferred embodiments thereof, from which the structural features outlined above and various details of construction will be made apparent.

In the drawings:

Figure 1 is a rear view of a fastening device embodying this invention, shown engaged by a stud provided with spiral slots.

Figure 2 is a partial sectional view of the subject of Figure 1.

Figure 3 is a sectional view on line 3—3 of Figure 2.

Figure 4 is a sectional view showing a detail of construction of the subject of Figure 1.

Figure 5 is a sectional view, showing a detail of construction of the subject of Figure 1, taken at right angles to Figure 4.

Figure 6 is a sectional view, on line 6—6, Fig. 1 showing a modification of the subject of Figure 1.

Figure 7 is a rear view of the subject of Figure 6, partly in section.

Figure 8 is a plan view on a small scale showing a modified detail of construction.

Figure 9 is a detailed view on a small scale showing the position of parts of the structure shown in Figure 7 when the stud is in locked position.

Referring to the several figures, A and B, respectively indicate the two members to be secured together. For example, let us say that the member A is the surface of an airplane wing having an aperture therethrough, one edge of the wing being indicated at $a$, and that B is a cover for the aperture to be removably secured to the wing surface A.

The cover B is fitted with a "Dzus" stud 1, constructed and rotatably secured to the cover B, for example, as shown by United States Patent No. 1,955,740; and having a head 2, grooved as at 3 for reception of a screw driver and having opposite spiral slots 4, 4x extending from its tubular end 5.

The keeper member, embodying this invention, comprises a flat spring 6 of substantial width, the end portions of which are bent upon themselves to form tabs 7, 7x, at opposite ends of the spring, and which are secured, as by rivets 8, 8x, to the under or back side of the wing surface A on opposite sides of an aperture 9 formed in the wing surface for the passage of the stud 1.

The spring 6 is apertured as at 10 in line with the extension of the stud 1, and the aperture is desirably made of a greater diameter than that of the tubular end portion 5 of the stud 1.

In forming the aperture 10 the material of the spring will desirably be drawn or extended at the perimeter of the aperture to present a rounded surface 11 to the end of the stud 1, to guide its entry into the keeper; and to provide a depending flange or skirt 12 extending below the under or back surface of the spring which will act to support the stud against lateral or shearing force.

Extending across the aperture 10 is a cross bar or pin 13, preferably circular in cross section and adapted to be engaged in the spiral slots 4, 4x, of the stud 1.

The pin or cross bar 13 may be secured to the spring member 6 in various ways. Thus its ends may extend into recesses 14, 14x, in the skirt 12 and be secured by means of ears 15, 15x, formed from material of the spring not removed in forming the aperture 16, 16x, formed to facilitate entry and riveting of the rivet 8.

Where the recesses 14, 14x, are provided for the reception of the ends of the pin or cross bar 13, they may and desirably will be made of a length greater than the diameter of the pin, so that the pin will be movable or have play in a plane parallel to that of the spring, which will take care of any inaccuracy in alignment of the stud with the keeper as a whole.

Again, as shown in Figures 6 and 7, the pin or cross bar 13a may have a Z form with its ends 13', 13'x, bent oppositely so that its body portion will extend in a direction such that when fully engaged or locked by the stud 1, the recess 3 in the head of the stud will extend in line with the rivets 8, 8x, as shown in Figure 9, as is desirable in practice.

As shown in Figure 8, the pin 13ax may be formed by stamping out from the spring member 6 and may, if desired, extend, as shown, at an angle to a line extending between the rivets 8.

In order to limit the stretch of the spring 6, as when the cover B is subjected to excessive lifting force, the spring is provided on opposite sides with stops 17, 17x, adapted to contact with the wing surface A and stop the spring short of its elastic limit. As shown in Figures 6 and 7, the stops may be provided, as shown at 17', 17'x, by bending up the ends of the tabs 7', 7'x.

In producing the device according to this invention, it will be apparent that the spring 6 in its various details may be fabricated by die shaping, punching and pressing operations upon material, as spring steel, selected or formulated and treated to give a spring of maximum efficiency. At the same time, the pin or cross bar 13 may be formed by simple drawing and cutting operations upon material, as hardened steel, selected or formulated and treated to give a strength member of maximum efficiency, it being noted that the pin or cross bar member 13 or 13a serves only the function of a strength member and is not required to have any resiliency or elasticity, whereas the spring 6 essentially supplies the elasticity requisite to the device.

It will, of course, be appreciated that the spring 6 and the pin or cross bar 13 may be made of different materials selected respectively as best suited to the functions of the spring and pin respectively.

From the foregoing description, it is believed that the novel and advantageous structural features and the several advantages thereof will be apparent.

It is to be noted that the above description in various detail is intended for illustrative purposes only and that it is contemplated that various modification in detail of the structure described may be made without departing from the scope of the appended claims.

What I claim and desire to protect by Letters Patent is:

1. A keeper for a stud of a fastening device having spiral slots and a head, comprising a flat spring having a body portion, a tab extending from each of the opposite ends of the body adapted to be secured to a base to which a member is to be secured by the stud through which it passes, there being a central aperture in the body of greater diameter than the stud bounded by an annular flange, said flange having diametrically opposite recesses, a non-resilient bar mounted in said recesses spanning the aperture arranged to be engaged by the spiral slots in the stud for drawing the member to be secured against the base by the head thereof, and projections extending from the body of the spring for retaining the bar in position in the flange.

2. A keeper for a stud of a fastening device having spiral slots and a head, comprising a flat spring having a body portion, a tab extending towards the stud from each of the opposite ends of the body adapted to be secured to a base to which a member is to be secured by the stud through which it passes, there being a central aperture in the body of greater diameter than the stud bounded by an annular flange, said flange having diametrically opposite recesses, a non-resilient bar mounted in said recesses spanning the aperture arranged to be engaged by the spiral slots in the stud for drawing the member to be secured against the base by the head thereof, and projections extending from the body of the spring for retaining the bar in position in the flange.

3. A fastening device for a stud having spiral slots comprising a flat spring adapted to be secured at its ends to a part to be fastened, said spring having an annular flange intermediate its ends surrounding an aperture through the spring for the reception of the stud, said flange having diametrically opposite recesses, a pin for engagement in the spiral slots of the stud seated in said recesses in the flange and spanning the aperture, and a projection from the body of the spring extending over each end of the pin.

4. A fastening device for a stud having spiral slots comprising a flat spring adapted to be secured at its ends to a part to be fastened, said spring having an annular flange intermediate its ends surrounding an aperture through the spring for the reception of the stud, said flange having diametrically opposite recesses, a pin for engagement in the spiral slots of the stud seated in said recesses in the flange and spanning the aperture, and a projection from the body of the spring extending over each end of the pin, said recesses in the flange being of greater width than the diameter of the pin to permit the pin to move to a slight degree about the aperture.

EDMOND C. CROWTHER.

(References on following page)

REFERENCES CITED

The following references are of record in the file of this patent:

UNITED STATES PATENTS

| Number | Name | Date |
|---|---|---|
| 1,955,740 | Dzus | Apr. 24, 1934 |
| 2,123,068 | Summers | July 5, 1938 |
| 2,171,773 | Von Mertens | Sept. 5, 1939 |
| 2,293,581 | Whitesell, Jr. | Aug. 18, 1942 |
| 2,295,488 | Mack | Sept. 8, 1942 |
| 2,307,132 | Hufferd | Jan. 5, 1943 |
| 2,317,787 | Mack | Apr. 27, 1943 |
| 2,327,555 | Purinton | Aug. 24, 1943 |
| 2,347,675 | Dzus | May 2, 1944 |